United States Patent Office 2,781,395
Patented Feb. 12, 1957

2,781,395

EXOISOMER OF DICYCLOPENTADIENE DICARBOXYLIC ACID

Herbert K. Wiese, Cranford, N. J., assignor to Esso Research and Engineering Company, a corporation of Delaware No Drawing. Application December 14, 1954,
Serial No. 475,295

9 Claims. (Cl. 260—468)

This invention relates to the exo-stereoisomer of cyclodiene dicarboxylic acids and to a process for their preparation. In particular it relates to the exo-isomer of dicyclopentadiene discarboxylic acid and its preparation by carboxylation of cyclopentadienyl sodium at temperatures below 0° C.

Cyclodiene dicarboxylic acids have many useful properties. For instance, alcohol esters of either the unsaturated acids or the hydrogenated acids obtained therefrom constitute valuable solvents as well as plasticizers for resins and coating materials.

The preparation of such dicarboxylic acids has been described previously in Patent No. 2,716,662 of Cohen et al. and also in copending application Serial No. 401,437, filed December 30, 1953. Such preparations generally involve the reaction of finely divided metallic sodium with monomeric cyclodienes such as cyclopentadiene in the presence of a small amount of an anhydrous alcohol activator, followed by conversion of the resulting cyclodienyl sodium to the disodium salt of dicyclopentadiene dicarboxylic acid by treatment with carbon dioxide. Other processes employing potassium instead of sodium also are known.

Heretofore it was believed that the carboxylation of the alkali metal cyclodienyl compound such as cyclopentadienyl sodium produced only the endo- or trans-dicyclopentadiene dicarboxylic acid. The steric configuration of this compound can be represented by the following formula:

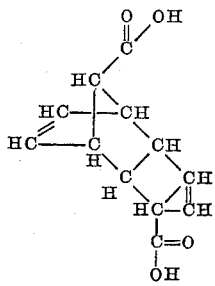

It has now been found that the dicyclodiene dicarboxylic acid can also be produced in the form of a heretofore unknown exo- or cis-stereoisomer. This isomer can be represented by the following steric formula:

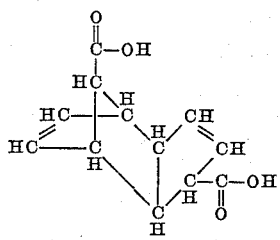

That is, the exo-isomer has both carboxyl groups above the plane of symmetry, whereas the endo-isomer has one carboxyl above and the other below the plane. As distinguished from the known endo-isomer, the new exo-isomer has a lower melting point and is about three times more soluble in common oxygenated solvents. For example, the solubility in anhydrous methanol at room temperature is about 4 wt. percent for the endo-isomer and around 11 wt. percent for the exo-isomer. The exo-isomer is also markedly more reactive and more readily crackable to its monomeric form which, while unstable as such, is a valuable reagent which can be combined with a variety of other compounds.

It has further been discovered that the steric structure of the dicarboxylic acid product depends on the temperature at which the carboxylation of the metal cyclodienyl compound is carried out. More specifically it has been found that carboxylation at temperatures below 0° C., preferably between about —20° to —75° C., produces a dicarboxylic acid product surprisingly rich in the exo-isomer. The carbon dioxide pressure in the carboxylation may range from less than 1 to about 1,000 p. s. i. g., the latter being the approximate tank pressure of commercially available carbon dioxide. Pressures in the range of about 1 to 100 p. s. i. g. are preferred.

The invention is of particular interest in connection with the preparation of the cyclopentadiene derivatives. However, similar derivatives can be obtained by treatment of the corresponding alkali metal compound of alkylated cyclopentadienes such as methylcyclopentadienyl sodium, dimethylcyclopentadienyl potassium, ethylcyclopentadienyl sodium, and the like.

The rate at which the alkali metal cyclodienyl is fed into the reactor is a function of the carboxylation conditions such as carbon dioxide pressure, temperature, and degree of agitation in the reaction zone. In brief, in order to realize the advantages of this process the carboxylation should be carried out in such a manner than an excess of carbon dioxide is present at all times. The carboxylation is desirably carried out by adding the alkali metal cyclodienyl to a reaction zone containing carbon dioxide dissolved in an inert hydrocarbon such as benzene, toluene, xylene, petroleum naphtha, petroleum ether, and the like. If the opposite procedure is followed and carbon dioxide is added to a reaction zone containing the metal cyclodienyl compound, substantial amounts of unwanted side products tend to be formed, since in such a case it is all but impossible to have an excess of carbon dioxide present. Dry Ice is particularly convenient for making up the carbon dioxide solution required in this invention. The carboxylation can be effected either batch-wise or continuously. For instance, a continuous operation may involve feeding the alkali metal cyclodienyl to the bottom of a reactor and withdrawing carboxylated salt at the top. Depending on the particular combination of conditions employed, the residence time can be varied from about 20 seconds or less to about thirty minutes or more.

In preparing the alkali metal cyclodienyl, an alkali metal such as sodium, potassium or lithium is employed in the form of a finely divided dispersion wherein the metal particles preferably have an average size of less than 50 microns in diameter. Dispersion can be obtained, for example, by vigorous mechanical agitation of the molten metal in a suitable hydrocarbon medium in a colloid mill or the like, with or without the aid of a dispersing agent such as sodium stearate or oleate, and allowing the dispersion to cool below the melting point of the metal. A small amount of an alcohol activator, e. g. an anhydrous lower aliphatic alcohol such as methanol or isopropanol is preferably employed in the reaction, amounts equal to about 0.001 to about 0.1 mole equivalents, or preferably about 0.01 to 0.05 mole equivalents based on the alkali metal, being suitable. The alcohol is added to the metal after it has been dispersed and just before it is reacted with the cyclodiene; or it may be added while the dispersed metal is being reacted with the cyclodiene.

The hydrocarbon medium employed in making the alkali metal dispersion may be any inert aromatic hydrocarbon such as xylene, toluene or benzene, or an aliphatic hydrocarbon such as heptane or hexane, or light naphtha, or a higher boiling solvent such as a white oil, or mixtures thereof.

The aromatic solvents have the advantage of activating the sodium and consequently in their presence the alkali metal can be reacted with the cyclodiene at relatively low temperatures. However, aliphatic solvents are also practical, though they may require a somewhat higher reaction temperature. It is preferred to employ a hydrocarbon medium which boils above the melting point of the alkali metal being used, i. e., one boiling between about 110 and 165° C. in the case of sodium, or one boiling above about 75° C. in the case of potassium; this permits preparation of the metal dispersion at atmospheric pressure. A sufficient amount of hydrocarbon is normally used to make a dispersion containing about 2 to 50% of metal by weight, preferably about 8 to 10%.

Using sodium and cyclopentadiene as illustrative materials, the preparation of the novel dibasic acid isomers involves, first, the known preparation of the sodium cyclopentadiene derivative, usually from freshly prepared cyclopentadiene monomer; second, the low temperature carboxylation and simultaneous dimerization of the cyclopentadienyl sodium to give the exo-isomer of the corresponding dibasic acid salt, $C_{12}H_{10}O_4Na_2$; and, third, acidification of the resulting dibasic acid salt and purification of the precipitated dibasic acid. This series of reactions is summarized by the following equations:

(1) 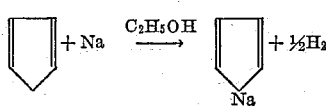

(2) 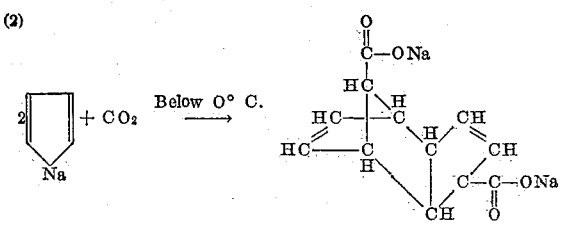

(3) 

$C_{12}H_{10}O_4Na_2 + dil.H_2SO_4 \rightarrow C_{12}H_{12}O_4 + Na_2SO_4$

The operation and effectiveness of the present invention is further illustrated in the examples described below. In each instance cyclopentadienyl sodium was first prepared as follows:

46 g. (two moles) of sodium was dispersed in 600 ml. of xylene. While the dispersion was kept at 40° C. and blanketed with nitrogen, 3 ml. of isopropyl alcohol was added, followed by dropwise addition of 158.4 g. (2.4 moles) of freshly prepared cyclopentadiene monomer. The addition of cyclopentadiene extended over a period of about 75 minutes while the reaction mixture was kept between 39 and 45° C. by cooling

*Example 1*

The carboxylation was carried out as follows: 176 g. (2 moles) of cyclopentadienyl sodium was slowly added, over a period of about 75 minutes, into a reaction vessel containing 750 ml. of xylene which was kept saturated with carbon dioxide at the desired carboxylation temperature. The cyclopentadienyl sodium was introduced directly into the xylene phase and added at such a rate that an excess of carbon dioxide was present at all times. When carrying out the carboxylation at —30 to —20° C. carbon dioxide gas was passed through the xylene phase in the carboxylation vessel at essentially atmospheric pressure. Whereas when carboxylating at +18 to +25° C. about 40 p. s. i. g. of carbon dioxide pressure was maintained on the reaction vessel at all times. After all the cyclopentadienyl sodium was added, the reaction mixture was stirred an additional 15 minutes in the presence of excess carbon dioxide. The disodium salt of dicyclopentadiene dicarboxylic was then dissolved in water by adding one liter of water to the reaction vessel. The two phases were separated and the aqueous phase acidified with 50% $H_2SO_4$ to spring the dicyclopentadiene dicarboxylic acid. The acid was filtered off and allowed to dry. When the melting point of the crude acid product was determined, it was observed that some decomposition occurred due to a slight splitting out of carbon dioxide.

In order to prepare pure stereoisomers, the crude acid product was esterified with methanol by mixing the dibasic acid with a ten-fold excess of methanol and maintaining the mixture at about 70° C. in the presence of a catalytic amount of concentrated sulfuric acid. The resulting mixture of ester isomers was separated from the alcohol by fractional distillation, and finally the higher melting endo-dimethyl ester was separated from the lower melting exo-isomer by fractional crystallization. The crystallization was carried out batchwise and in stages by gradually lowering the temperature of the mixed esters to —20° C. and by filtering between the several temperature stages. No more crystals separated out even after two weeks standing at —20° C. The pure exo-dimethyl ester isomer appears to be amorphous, solidifying to a transparent mass at about —30° C. The pure endo-dimethyl ester was obtained by recrystallizing the high melting fraction from petroleum ether.

The free dicyclopentadiene dicarboxylic acid was obtained from the purified dimethyl ester by saponification followed by acidification.

The results are summarized below:

| Run No. | 1 | 2 |
|---|---|---|
| Carboxylation temp., ° C. | —30 to —20 | +18 to +25. |
| Yield of acid product, mole percent. | 90 | 90. |
| Melting point of acid product, °C. | 200–203 | 205–208. |
| Yield of dimethyl ester, pure isomer, wt. percent on acid charge. | 91 | 75. |
| Melting point of dimethyl ester | <—20° C. (pure exo-isomer). | 85° C. (pure endo-isomer). |
| Melting point of dibasic acid | 199–201° C. (pure exo-isomer). | 212–214° C. (pure endo-isomer). |

The results show that the crude dibasic acid of run 1, produced at low temperature according to this invention, had a somewhat lower melting point than the conventional product of run 2. This difference in melting points becomes more pronounced when the purified isomers are compared. Furthermore, the melting point determinations indicate that the low temperature product of run 1 was very rich in the exo-isomer of the dibasic acid.

The dimethyl esters of the two acid isomers show an even more striking difference in melting points. It will be observed that the dimethyl ester of the exo-isomer actually is a rather low freezing liquid whereas the ester of the endo-isomer is solid even at temperatures as high as 80° C. or more. This makes esters of the exo-isomer acid useful as plasticizers for plastics such as polyvinyl chloride type resins where the endo-isomer normally has no such utility. This difference in melting points is observable also in the case of the higher alkyl esters. The lower alkyl esters of the exo-isomer, being liquids, are also useful as insect repellants.

*Example 2*

In this example Dry Ice was used as the carboxylating agent. Specifically, a slurry containing 60 g. (0.68 moles) of cyclopentadienyl sodium dispersed in 300 ml. xylene was gradually fed into an open glass beaker containing 800 ml. xylene and an excess of solid Dry Ice. As a result of the Dry Ice present the temperature of reaction stayed between about −70 and −50° C. A reaction time of 1 hour was allowed.

The dicyclopentadiene dicarboxylic acid was recovered from the reaction mixture by the same procedure as described in Example 1. The acid yield was better than 95 mole percent based on the cyclodienyl sodium feed. The product had a melting point of 200 to 202° C. and again was found to be very rich in the exo-isomer.

The dibasic acids of this invention are also useful in the production of alkyd resins, as reagents in the production of polyester type lubricants or mineral oil additives, and as a source of other compounds. Hydrogenated derivatives, e. g. the dihydrodicyclopentadiene dicarboxylic acid which can be prepared by hydrogenation of the unsaturated acid in the presence of a hydrogenation catalyst such as Adams platinum oxide, are excellent replacements for or supplements to phthalic anhydride in soybean-alkyd resins.

The scope of the invention is particularly pointed out in the appended claims, especially when read in connection with and in the spirit of the foregoing description.

What is claimed is:

1. A process for producing an alkali metal salt of the exo-isomer of a dicyclopentadiene dicarboxylic acid which comprises mixing an alkali metal cyclopentadienyl with an excess of carbon dioxide and maintaining the reaction mixture at a temperature below 0° C.

2. A process according to claim 1 wherein the alkali metal cyclodienyl is selected from the class consisting of cyclopentadienyl sodium, methylcyclopentadienyl sodium, dimethylcyclopentadienyl sodium, and mixtures thereof.

3. A process according to claim 2 wherein the reaction temperature is maintained between −20° and −75° C.

4. In a process for producing a dicyclopentadiene dicarboxylic acid wherein finely divided metallic sodium is reacted with an excess of a cyclopentadiene hydrocarbon in the presence of a small amount of a lower aliphatic alcohol to form a sodium cyclopentadienyl compound, said sodium cyclopentadienyl compound is fed into a body of inert liquid hydrocarbon containing an excess of dissolved carbon dioxide in a carboxylation step, the resulting sodium salt of the cyclopentadiene dicarboxylic acid is recovered from the carboxylation step, and said salt is converted to free acid by acidification, the improvement which comprises conducting the carboxylation step at a temperature between −20 and −75° C.

5. A dibasic acid consisting essentially of an exo-isomer of a dicyclopentadiene dicarboxylic acid.

6. Exo-dicyclopentadiene dicarboxylic acid having a melting point in the range of about 199 to 203° C.

7. Dimethyl ester of an exo-dicyclopentadiene dicarboxylic acid.

8. Dimethyl ester of exo-dicyclopentadiene dicarboxylic acid.

9. A process for producing the sodium salt of the exo-isomer of dicyclopentadiene dicarboxylic acid from sodium cyclopentadienyl which comprises adding sodium cyclopentadienyl at a temperature between −20° and −75° C. to a liquid solution containing an excess of carbon dioxide dissolved in xylene.

References Cited in the file of this patent
UNITED STATES PATENTS
2,716,662   Cohen et al. _____ Aug. 30, 1955